E. S. DILLINGHAM.
BOLT LOCK.
APPLICATION FILED MAY 1, 1919.
1,370,198. Patented Mar. 1, 1921.
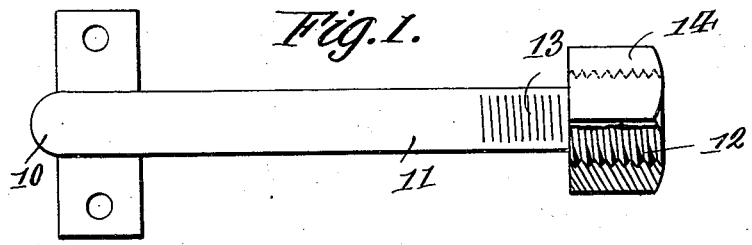
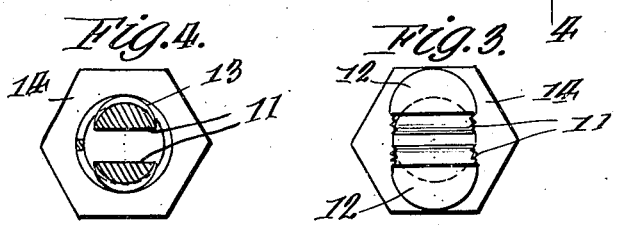
WITNESSES
Inventor
EARL S. DILLINGHAM

UNITED STATES PATENT OFFICE.

EARLE S. DILLINGHAM, OF ROCHESTER, NEW YORK.

BOLT-LOCK.

1,370,198. Specification of Letters Patent. Patented Mar. 1, 1921.

Application filed May 1, 1919. Serial No. 293,955.

*To all whom it may concern:*

Be it known that I, EARLE S. DILLINGHAM, a citizen of the United States, residing at Rochester, in the county of Monroe and State of New York, have invented certain new and useful Improvements in Bolt-Locks, of which the following is a specification.

My invention relates to new and useful improvements in bolt locks, and more particularly to that type of bolt consisting of a pair of normally diverging resilient arms, and an important object of my invention resides in the provision of means for preventing the bolt becoming disengaged from its work.

Another object of the invention resides in the provision of means whereby the locking element is prevented from becoming disengaged from the free ends of the bolt.

Another object of my invention is to provide a device of the above mentioned character which is strong, durable, can be manufactured at a minimum cost, and is efficient in practice.

Other objects and advantages of the invention will become apparent during the course of the following description.

In the accompanying drawings, forming part of a description and wherein like numerals are employed to designate like parts throughout the same, Figure 1 is a side elevation of my invention, the locking element thereof being on its way to a locked position.

Fig. 2 is a side elevation of the invention, with a central section taken through the locked element.

Fig. 3 is an end view of Fig. 2.

Fig. 4 is a transverse section taken on the line 4—4 of Fig. 2.

In the drawings wherein for the purpose of illustration is shown preferred embodiment of my invention, the numeral 9 designates in general the bolt, and in the present instance is shown in the form of a cotter pin. The bolt is constructed from a strip of spring metal, semi-circular in cross section, and the intermediate portion of the strip is formed into a loop 10 so that the remainder of the strip or the ends form a pair of resilient arms 11. These arms extend in the same direction and are normally arranged in diverging relation to each other. When these arms are retracted to their extent or brought into engagement with one another, the bolt shank is circular, in cross section.

The free end of each arm 11 is provided with a semi-circular enlargement 12. The curved surfaces of these enlargements are screw threaded as clearly shown in Fig. 2, and extend outwardly beyond the curved surfaces of the arm 11. When the arms are retracted to their extent so that the arms engage each other the two enlargements are drawn into engagement with each other and form a round threaded shank. The curved surface of each of the arms 11 is provided with screw threads 13 adjacent the enlargements 12 to receive the locking element 14. This locking element in this instance assumes the form of a nut having a threaded bore therethrough, and when the nut is arranged upon the threaded portion 13 of the arms, it is prevented from moving either one way or the other in view of the fact that the arms 11 normally diverge and accordingly the threads thereon are jammed into close engagement with the threaded bore through the nut. It is prevented from becoming disengaged from the arms 11, when these arms spring into their normal position by the nut abutting with the inner ends of the enlargements 12. However, when it is desired to remove the nut from the arm, they are simply retracted to their extent until they engage each other, then as the two enlargements form a round threaded shank, the nut 14 can be readily disengaged from the bolt, as the bore through the nut is sufficient to pass over or engage the threads on the enlargement 12.

The foregoing description and the drawings have reference to what may be considered the preferred, or approved form of invention. It is to be understood that I may make such changes in construction and arrangement and combination of parts, materials, dimensions, etc., as may prove expedient and fall within the scope of the appended claim.

Having thus fully described my invention, what I claim as new and desire to secure by Letters Patent, is:

The combination with a bolt having the shank thereof threaded and formed into a pair of normally diverging resilient arms, each arm having its free end provided with a threaded semi-circular enlargement, said enlargement extending beyond the surface of the bolt to provide shoulders, of a nut adapted to be threaded over said enlargement and upon the threaded portion of said bolt and prevented from accidental displacement by said shoulders.

In testimony whereof I affix my signature in presence of two witnesses.

EARLE S. DILLINGHAM.

Witnesses:
HENRY W. HALL,
RICHARD R. POWELL.